United States Patent [19]

Bowers

[11] Patent Number: 4,844,115

[45] Date of Patent: Jul. 4, 1989

[54] BUTTERFLY VALVE

[76] Inventor: Rudy M. Bowers, P.O. Box 6528, Incline Village, Nev. 89450

[21] Appl. No.: 264,831

[22] Filed: Oct. 31, 1988

[51] Int. Cl.[4] .......................... B08B 3/02; B08B 9/06; F16K 1/32; F16K 35/04

[52] U.S. Cl. .................................. 137/240; 137/315; 134/166 C; 251/93; 251/288; 251/297; 251/306

[58] Field of Search .................. 251/92, 93, 101, 102, 251/104, 111, 113, 297, 305, 306, 284, 285, 286, 288; 137/238, 240, 315; 134/166 C, 167 C

[56] References Cited

U.S. PATENT DOCUMENTS

| | | | |
|---|---|---|---|
| 2,274,318 | 2/1942 | Campbell | 251/297 |
| 2,965,354 | 12/1960 | Grove et al. | 251/297 |
| 3,215,400 | 11/1965 | Muller | 251/306 |
| 3,228,415 | 1/1966 | Geiss | 251/101 |
| 3,329,394 | 7/1967 | Overbaugh | 251/99 |
| 3,355,141 | 11/1967 | Cooper | 251/101 |
| 3,357,680 | 12/1967 | Williams | 251/305 |
| 3,498,584 | 3/1970 | Bowers | 251/305 |
| 3,537,473 | 11/1970 | DeZurik, Jr. | 251/285 |
| 3,647,180 | 3/1972 | Church | 251/306 |
| 3,837,620 | 9/1974 | Malloy et al. | 251/306 |

FOREIGN PATENT DOCUMENTS

| | | | |
|---|---|---|---|
| 3604499 | 2/1987 | Fed. Rep. of Germany | 251/306 |

*Primary Examiner*—George L. Walton

*Attorney, Agent, or Firm*—Harris, Kern, Wallen & Tinsley

[57] ABSTRACT

A butterfly valve having a two piece body, an annular seat carried in the body and a disk mounted in the body for rotation within the seat. An indicator plate mounted at one end of the body and a valve actuator attached to the disk shaft and overlying the plate with a detent arrangement for indicating valve position. Outlet nozzles carried on the disk with a flow path from the exterior of the valve to the nozzles for introducing fluid flow into the pipeline, with check valves in the valve body and in the nozzles. A special disk configuration for reducing damage to the disk edge.

13 Claims, 2 Drawing Sheets

BUTTERFLY VALVE

BACKGROUND OF THE INVENTION

This invention relates to butterfly valves designed for clamping between flanges in a pipeline, typically in an oil field, and is an improvement on the butterfly valve shown in U.S. Pat. No. 3,498,584. Experience in the field with construction and operation of the prior valve has given rise to a need for improvement in design and operation, and it is an object of the present invention to provide such a new and improved butterfly valve.

Some of the problems are excessive wear of the valve disk, alignment problems of valve parts when the valve is disassembled for replacing a valve seat, operator error in opening, closing and setting the valve, accomodation of both manual and remote control devices, and clogging of the fluid injection system.

Other objects, advantages, features and results will more fully appear in the course of the following description.

SUMMARY OF THE INVENTION

A butterfly valve having a body with an annular seat carried in the body and a disk mounted in the body for rotation within said seat, with a valve actuator attached to the disk shaft and overlying an indicator plate mounted on the body. The indicator plate carries a plurality of detent openings arranged in an arc, and the actuator has a spring loaded detent member for engaging the detent openings as the actuator rotates the shaft and disk. In the preferred embodiment, the indicator plate is circular with the detent openings in the rim of the plate and with the actuator having a shoulder overlying the rim and carrying the detent member, with this shoulder aligned with the disk to provide a visual indication of valve condition at all times. Preferably the indicator plate is attached to the valve body by screws, with the screws positioned in predetermined positions to serve as stops for actuator rotation.

The valve also includes a hollow shaft in communication with one or more nozzles carried on the disk, with the shaft providing for fluid flow from the exterior through the nozzles and into the pipeline, with a check valve carried in the hollow shaft and a check valve carried in each nozzle.

The valve body is formed of two semi-circular halves which are taken apart for removal and replacement of valve seats, with the alignment of the body halves controlled by alignment pins positioned through the flanges of the body halves.

A special shape of disk is provided for protecting the disk edge from wear by the fluid flow through the valve. The disk has a central section along the pivot axis with wings projecting in opposite directions, with each of the wings having a thicker inner section and a thinner outer section with the outer section beigg crescent shaped, and preferably with the periphery of the disk having a rounded edge engaging the valve seat.

DESCRIPTION OF THE PREFERRED EMBODIMENT

Figure 1:
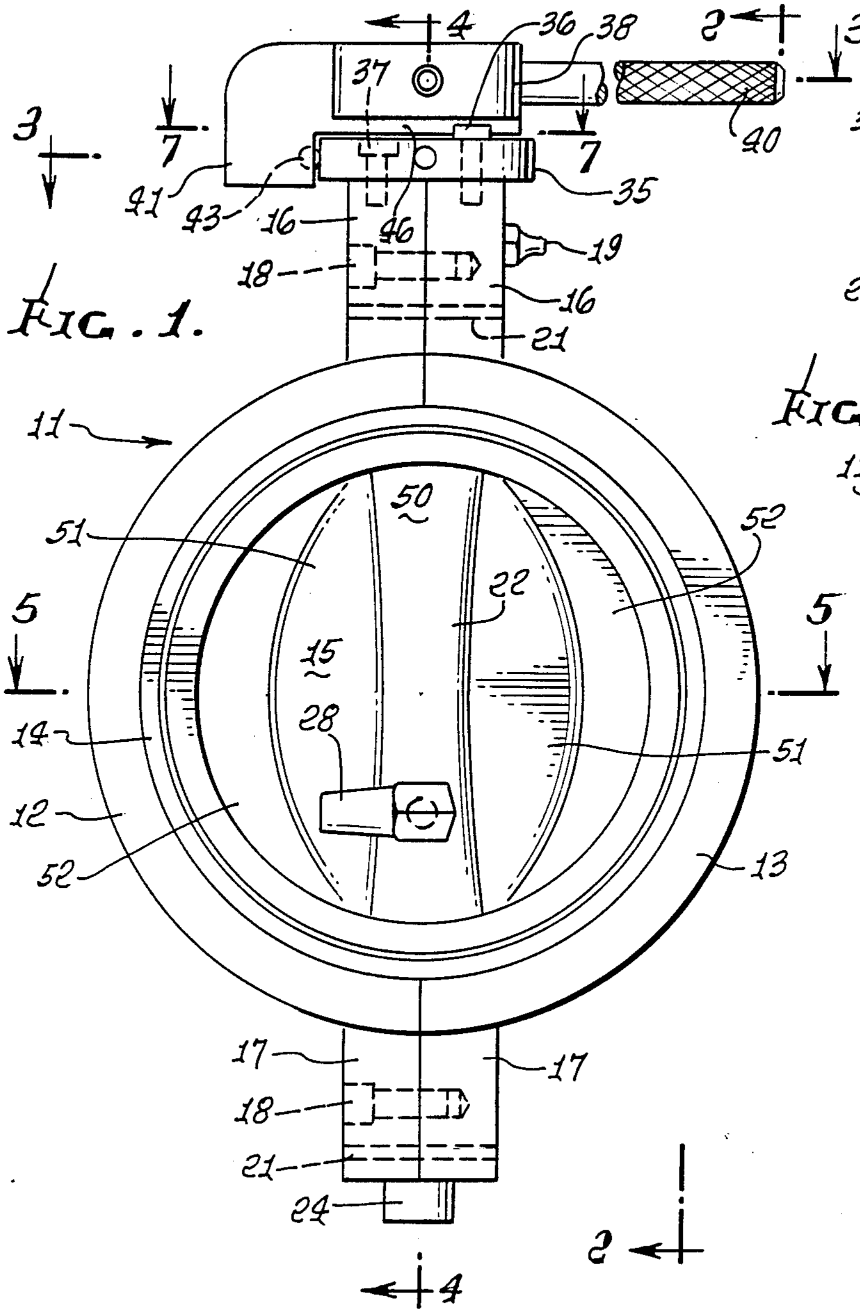
FIG. 1 is an end view of a butterfly valve in the closed position and incorporating the presently preferred embodiment of the invention.
Figure 2:
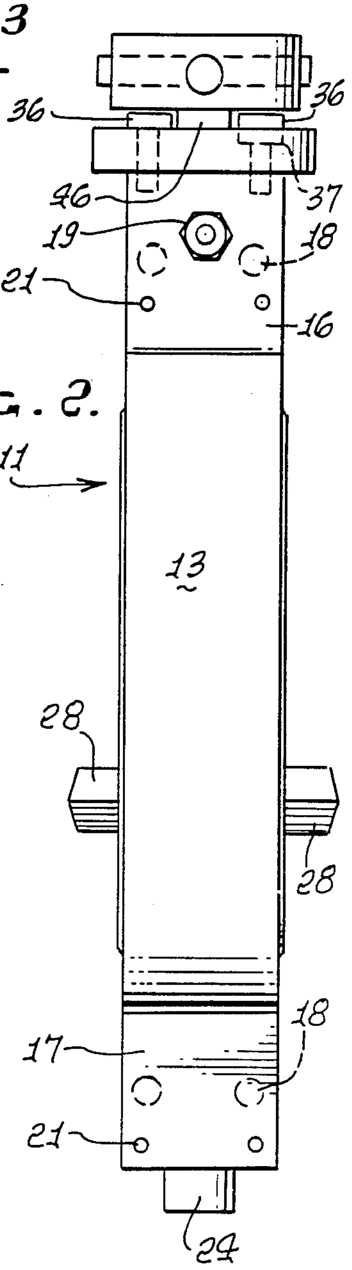
FIG. 2 is a side view taken along the line 2—2 of FIG. 1.
Figure 3:
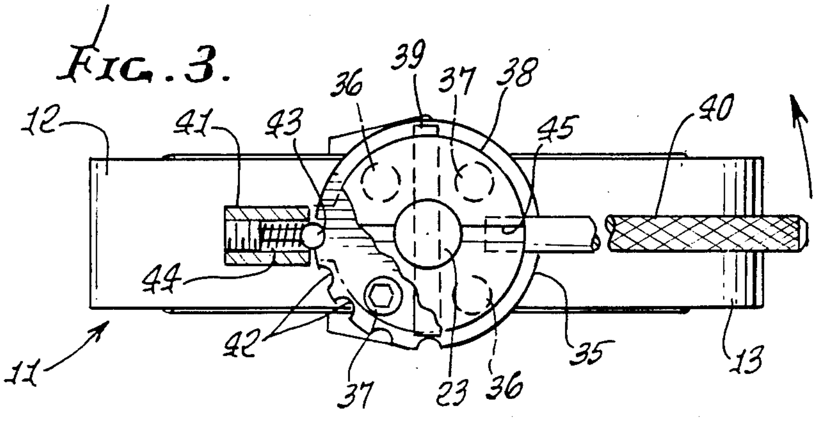
FIG. 3 is a top view taken along the line 3—3 of FIG. 1.

The valve of the invention as shown in the drawing figures includes a body 11 formed of semi-circular half sections 12, 13, with an annular seat 14 clamped within the body sections, and a circular disk 15 mounted in the body for rotation within the seat. Each of the body sections 12, 13 has an upper flange 16 and a lower flange 17, with the body sections being joined together at the flanges by screws 18. A grease fitting 19 may be mounted in one of the flanges if desired for lubrication of the shaft.

The annular seat 14 typically is a molded elastomer or the like, and may be the same as that shown in the aforementioned U.S. Pat. No. 3,498,584. The seat is replaceable by removing the screws 18 to separate the two body half sections. The old seat is discarded and a new seat is clamped between the two half sections. In order to maintain precise alignment between the two half sections during the seat replacement operation, alignment pins 21 are positioned in the two half sections, with two pins being used in each end of the half sections in the embodiment illustrated. During initial assembly, with the two half sections exactly aligned as desired, holes are drilled through the mating flanges for receiving the pins. Then the pins always provide for the desired alignment of the two half sections, regardless of any play in the openings for the screws 18.

In the prior art design the body sections 12, 13 were held together by bands or rings positioned around the upper flanges 16 and around the lower flanges 17. In order to change a seat or a disk, the bands had to be removed and replaced, usually requiring special tools. Also the bands tended to loosen and break. The present design with the screws 18 and pins 21 eliminates the bands, and the device can be disassembled and reassembled using an Allen wrench for the screws.

Figure 4:
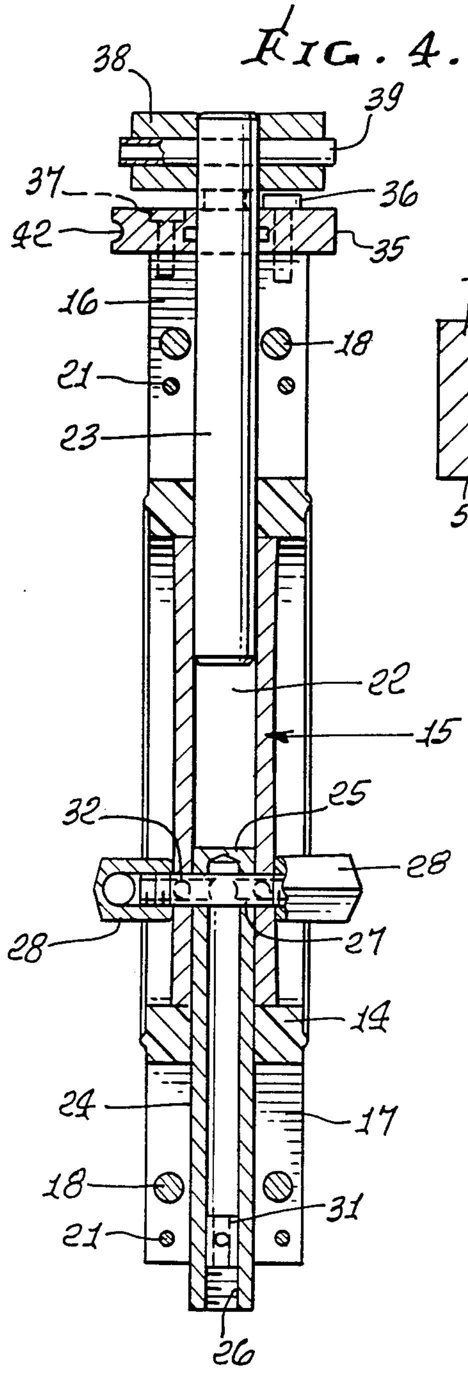
FIG. 4 is a sectional view taken along the line 4—4 of FIG. 1.

The disk 15 preferably has a tubular central section 22 with an upper shaft 23 and a lower shaft 24 positioned therein. As shown in FIG. 4, lower shaft 24 is tubular, is closed at its upper end 25, and has a threaded opening 26 at its lower end for connection of a line or fitting. The lower shaft 24 is fixed to the disk 15 by a transverse tube 27, with nozzles 28 threaded onto the projecting ends of the transverse tube 27. A check valve 31, typically a conventional spring and ball check valve, is carried in the lower shaft 24 adjacent the threaded opening 26. Similar check valves 32 are mounted in the transverse tube 27 adjacent each of the nozzles 28. The inlet opening 26, the tubular lower shaft 24, the transverse tube 27, and the nozzles 28 provide a flow path from the exterior of the valve to the pipeline in which the butterfly valve is installed. The nozzles may be utilized for cleaning or flushing the valve components and/or for introducing an additional fluid into the fluid flowing through the pipeline. The check valves serve to prevent backflow through the lower shaft and to prevent clogging of the nozzles and/or shaft by solids in the pipeline flow. The shafts can be joined to the disk by transverse pins or as press fits or otherwise as desired.

An indicator plate 35 is attached to the flanges 16 of the body half sections 12, 13 by two screws 36 and two screws 37. In the embodiment illustrated, the heads of the screws 36 project above the top surface of the plate 35, while the heads of the screws 37 are in counter-bores in the plate so that the heads are flush with or below the top surface of the plate. With this arrangement, the projecting screws 36 serve as limit stops for the rotation of the disk.

Figure 7:
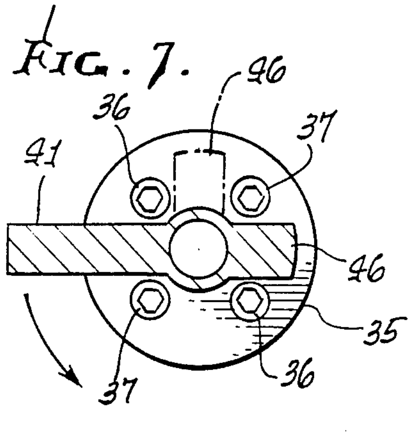
FIG. 7 is a sectional view taken along the line 7—7 of FIG. 1.

A valve actuator 38 is attached to the upper shaft 23 by a pin 39 and has a handle 40 threadedly mounted thereon. The indicator plate 35 preferably is circular in shape, and the valve actuator 38 includes a shoulder 41 which overhangs the edge of the indicator plate. A mechanism is provided for indicating to the operator who is rotating the disk by means of the handle, the position of the disk within the valve. In the embodiment illustrated, this is a detent mechanism with detent openings 42 arranged in an arc around the edge of the indicator plate, and a detent ball 43 and spring 44 carried in the shoulder 41 of the actuator. The handle 40 and the shoulder 41 are aligned with the disk 15, providing the operator with a visual indication of the disk position at all times. Also, the detent mechanism permits the operator to set the disk at predetermined positions between fully closed and fully opened. If desired, a groove 45 may also be provided in the upper surface of the actuator 38 to provide an indication of the position of the disk. A stop bar 46 is formed integral with the shoulder 41 on the actuator 38, with the stop bar engaging the high screws 36 at the two extreme positions of the disk, to provide a stop for the fully closed position and the fully opened position, as best seen in FIG. 7.

In an alternative arrangement, a shaft rotation device such as an electrical or pneumatic or hydraulic power unit can be mounted on the plate 35 or directly on the upper flanges 16 and attached to the shaft 23 for remote actuation of the valve.

Figure 5:
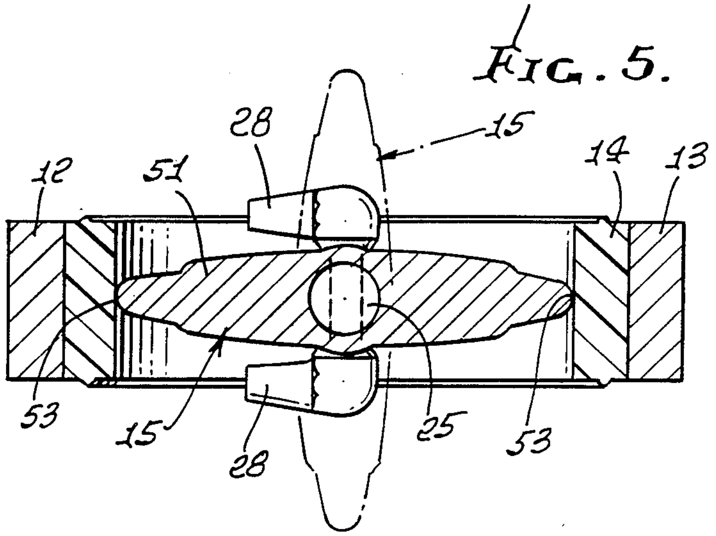
FIG. 5 is a sectional view taken along the line 5—5 of FIG. 1.
Figure 6:
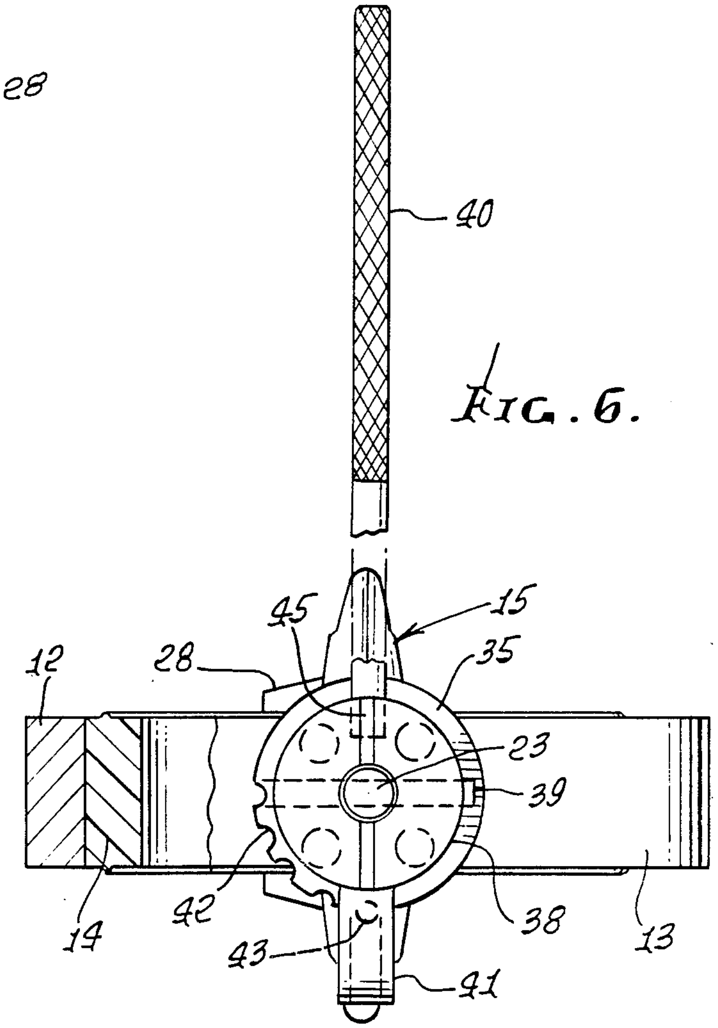
FIG. 6 is a view similar to that of FIG. 5 showing the valve in the open position.

The disk 15 has a special shape which reduces wear on the disk edge due to abrasive materials flowing through the pipeline. The unique disk configuration functions to deflect fluids away from the sealing edge of the disk and hence extends the operating life of the valve. Referring to FIG. 1, the disk has a central section 50 with opposed wings, with each wing having a thicker inner section 51 and a thinner outer section 52, with the outer section having a crescent shape. Also, the edge 53 of the disk is rounded, as best seen in FIG. 5. The central section 50 is preferably tubular for receiving the upper and lower shafts 23, 24.

The butterfly valve of the present invention is used in the same manner as are prior art butterfly valves. Typically the valve is clamped between flanges of pipes of a pipeline and is used for controlling fluid flow through the pipeline. When clamped between the flanges, the seat of the valve provides sealing engagement with the flanges, with the clamping pressure compressing the seat to provide sealing engagement between the seat and the disk when the valve is in the closed position.

I claim:

1. In a butterfly valve having a body, an annular seat carried in said body, and a disk mounted in said body for rotation within said seat, the improvement comprising in combination:

an indicator plate mounted at one end of said body;

said disk having a first shaft projecting through said body and plate; and a valve actuator attached to said first shaft and overlying said plate;

said plate having a plurality of detent openings arranged in an arc, said actuator having a spring loaded detent member for engaging said detent openings as said actuator rotates with said shaft and disk;

said body comprising two semi-circular half sections with flanges at each end of each half section with screw means for clamping said half sections together at said flanges, and at least one pin in each clamped pair of flanges parallel with and spaced from said screw means for maintaining said half sections in desired alignment during successive unclamping and clamping operations for valve seat replacement regardless of any play in the opening for the screw means.

2. A butterfly valve as defined in claim 1 wherein said actuator includes a stop bar positioned at said plate, and said plate is attached to said body by a plurality of screws, with two of said screws projecting above said plate at predetermined locations for engaging said stop bar and limiting rotation of said actuator and disk.

3. A butterfly valve as defined in claim 2 wherein said indicator plate is circular with said detent openings in the rim of said plate, and said actuator includes a shoulder overlying said rim, with said shoulder aligned with said disk and carrying said detent member.

4. A butterfly valve as defined in claim 3 including a second shaft on said disk opposite said first shaft and extending through said body, said second shaft having a fluid flow path therethrough with said flow path closed at the inner end and open at the outer end, at least one nozzle carried on said disk, with said nozzle coupled to said second shaft flow path, and a first check valve positioned in said second shaft adjacent said outer end for flow through said second shaft to said nozzle.

5. A butterfly valve as defined in claim 4 including a second check valve positioned in said nozzle for flow out through said nozzle.

6. A butterfly valve as defined in any one of claims 1–5 wherein said disk has a pivot axis with a tubular central section along said axis and wings projecting in opposite directions from said central section, with a rounded edge at the periphery of said disk and with each of said wings having a thicker inner section and a thinner outer section with said outer section being crescent shaped.

7. A butterfly valve as defined in claim 6 wherein said central section of said disk is of lesser width at its midpoint and of greater width at each end thereof.

8. In a butterfly valve having a body, an annular seat carried in said body, and a disk mounted in said body for rotation within said seat, the improvement wherein said body comprises two semi-circular half sections with flanges at each end of each half section, with screw means for clamping said half sections together at said flanges, and in least one pin at each clamped pair of flanges parallel with and spaced from said screw means for maintaining said half sections in desired alignment during successive unclamping and clamping operations for valve seat replacement regardless of any play in the opening for the screw means.

9. A butterfly valve as defined in claim 8 including a plate mounted at one end of said body on said flanges with said disk having a first shaft projecting through said body flanges and plate.

10. A butterfly valve as defined in claim 9 including a second shaft on said disk opposite said first shaft and extending through said body flanges, said second shaft having a fluid flow path therethrough with said flow path closed at the inner end and open at the outer end, at least one nozzle carried on said disk, with said nozzle coupled to said second shaft flow path, and a first check valve positioned in said second shaft adjacent said outer end for flow through said second shaft to said nozzle.

11. A butterfly valve as defined in claim 10 including a second check valve positioned in said nozzle for flow out through said nozzle.

12. A butterfly valve as defined in claim 9 wherein said disk has a pivot axis with a tubular central section along said axis and wings projecting in opposite directions from said central section, with a rounded edge at the periphery of said disk and with each of said wings having a thicker inner section and a thinner outer section with said outer section being crescent shaped.

13. A butterfly valve as defined in claim 12 wherein said central section of said disk is of lesser width at its midpoint and of greater width at each end thereof.

* * * * *